W. H. COLDWELL.
LAWN MOWER.
APPLICATION FILED MAR. 29, 1916.
1,279,266.
Patented Sept. 17, 1918.
6 SHEETS—SHEET 6.
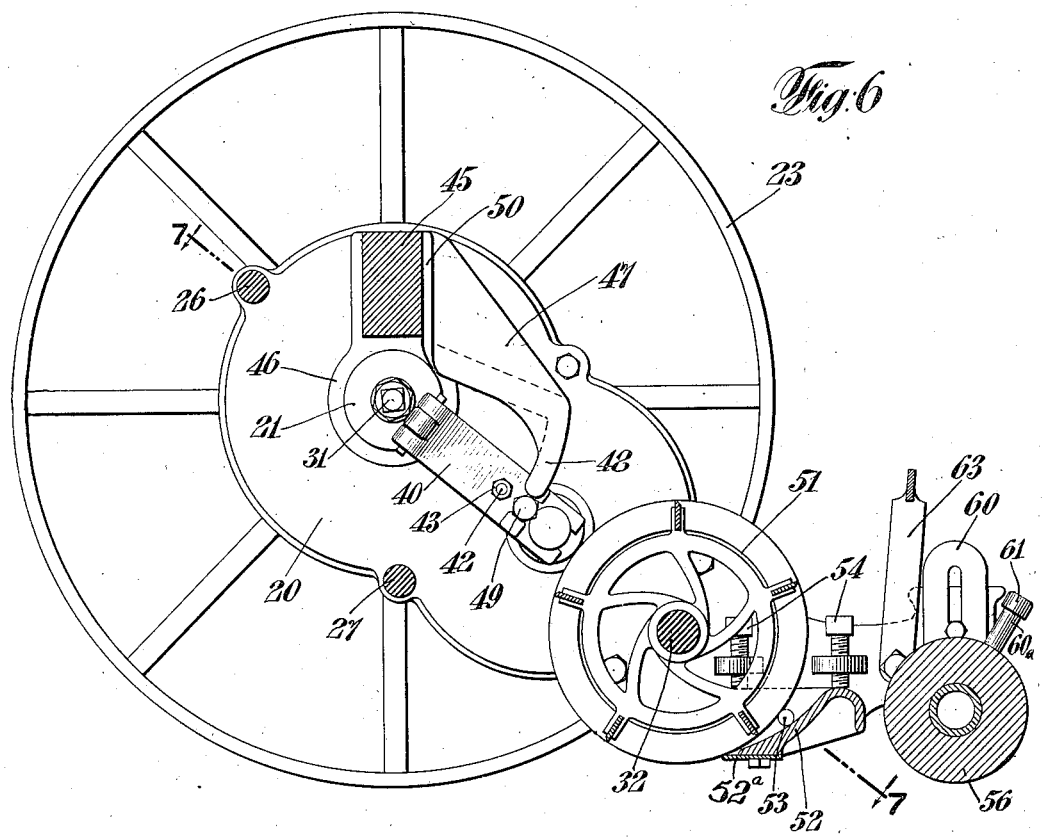
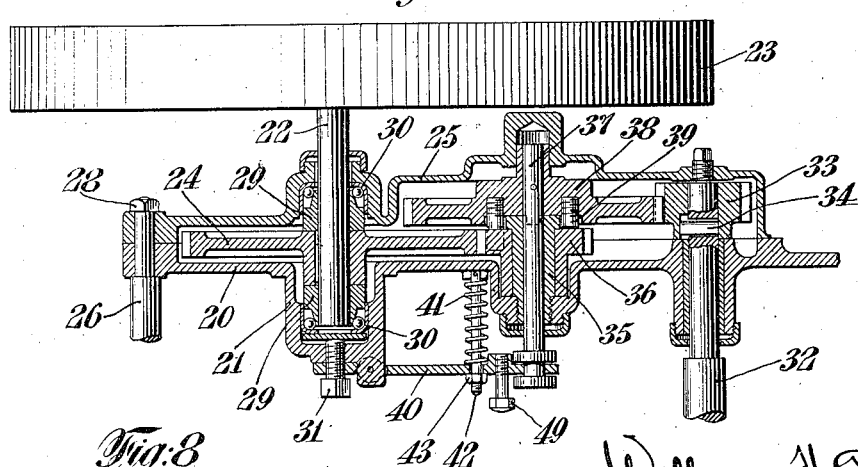
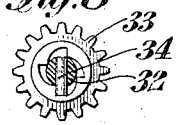

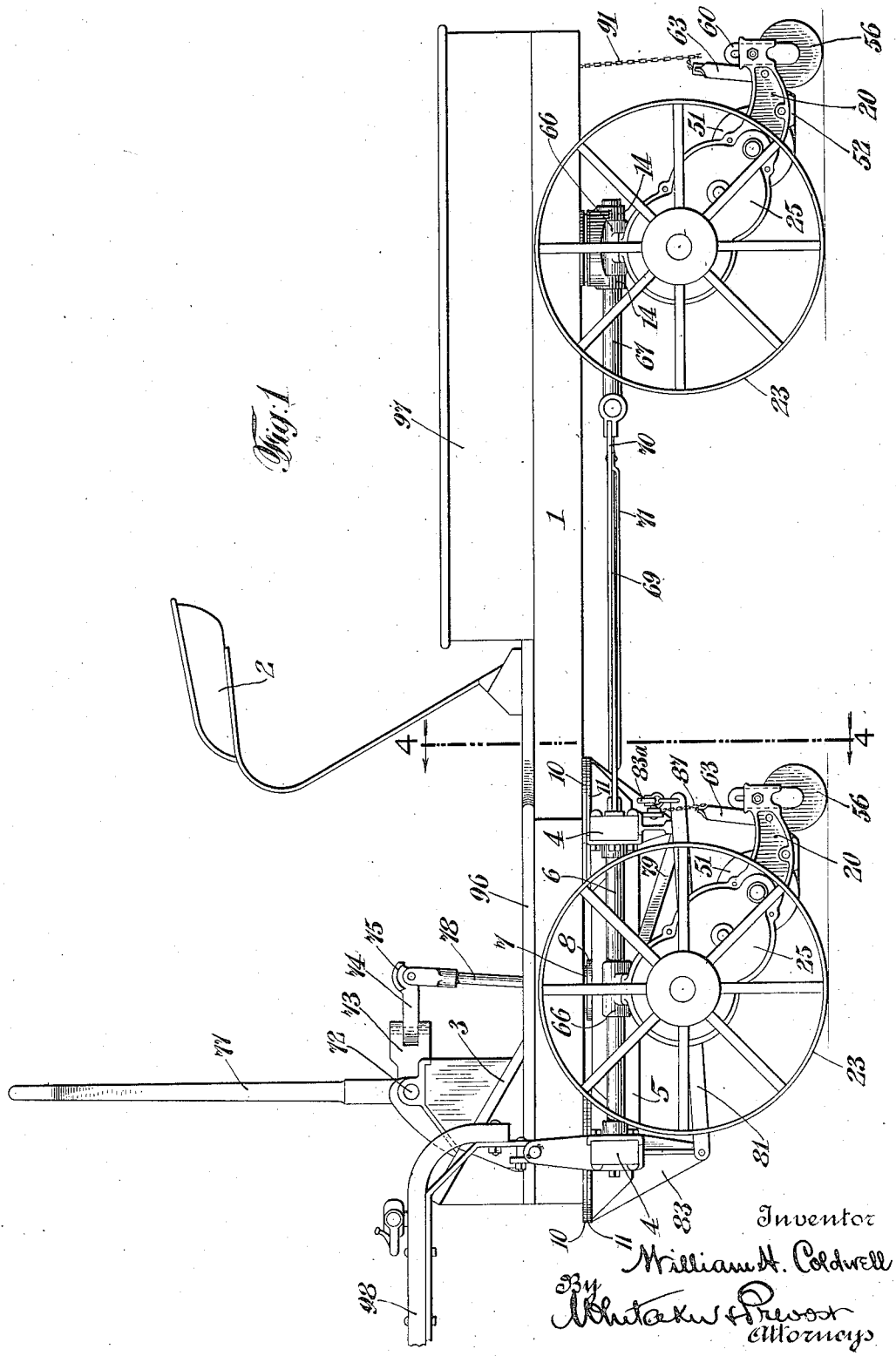

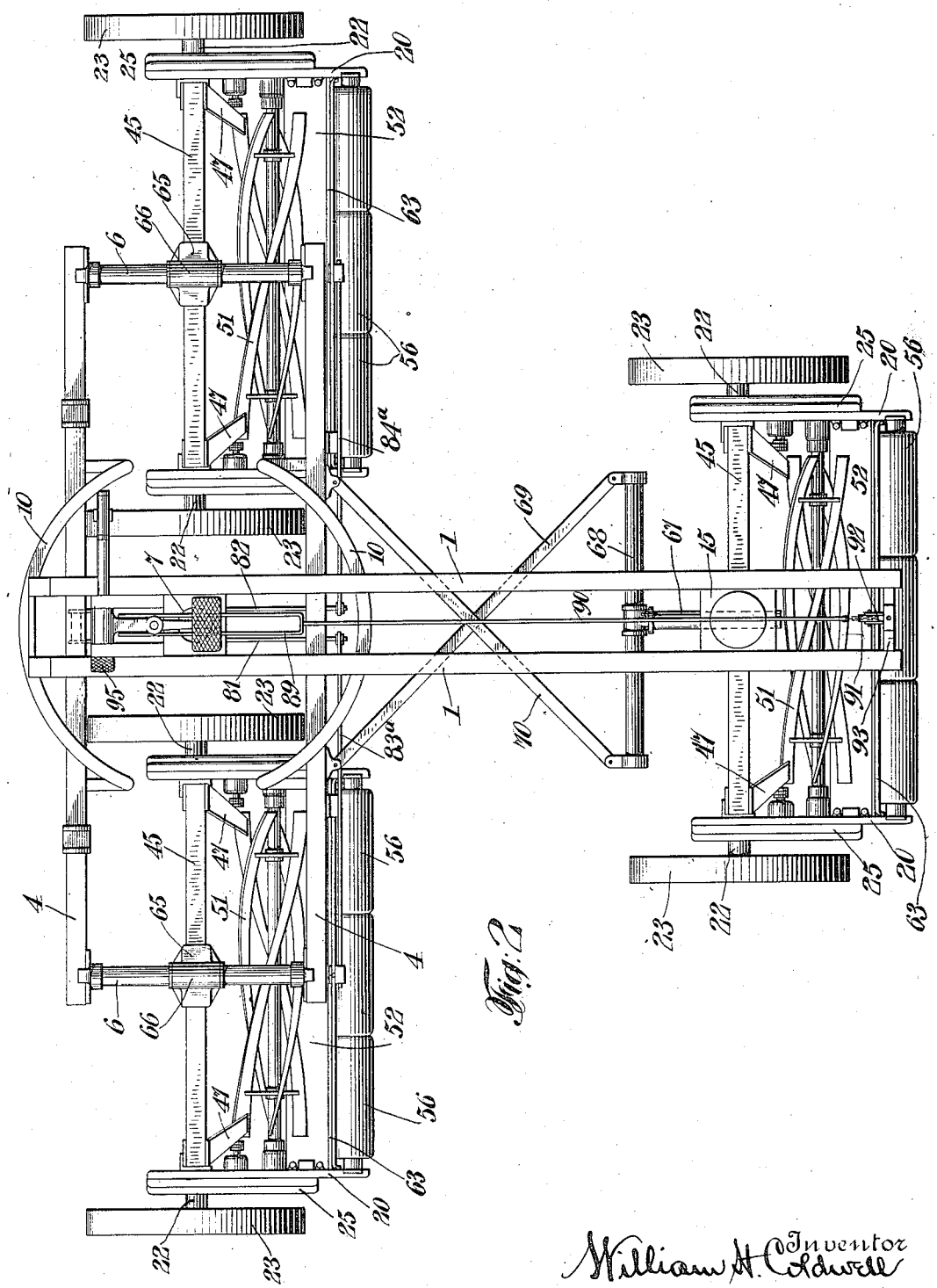

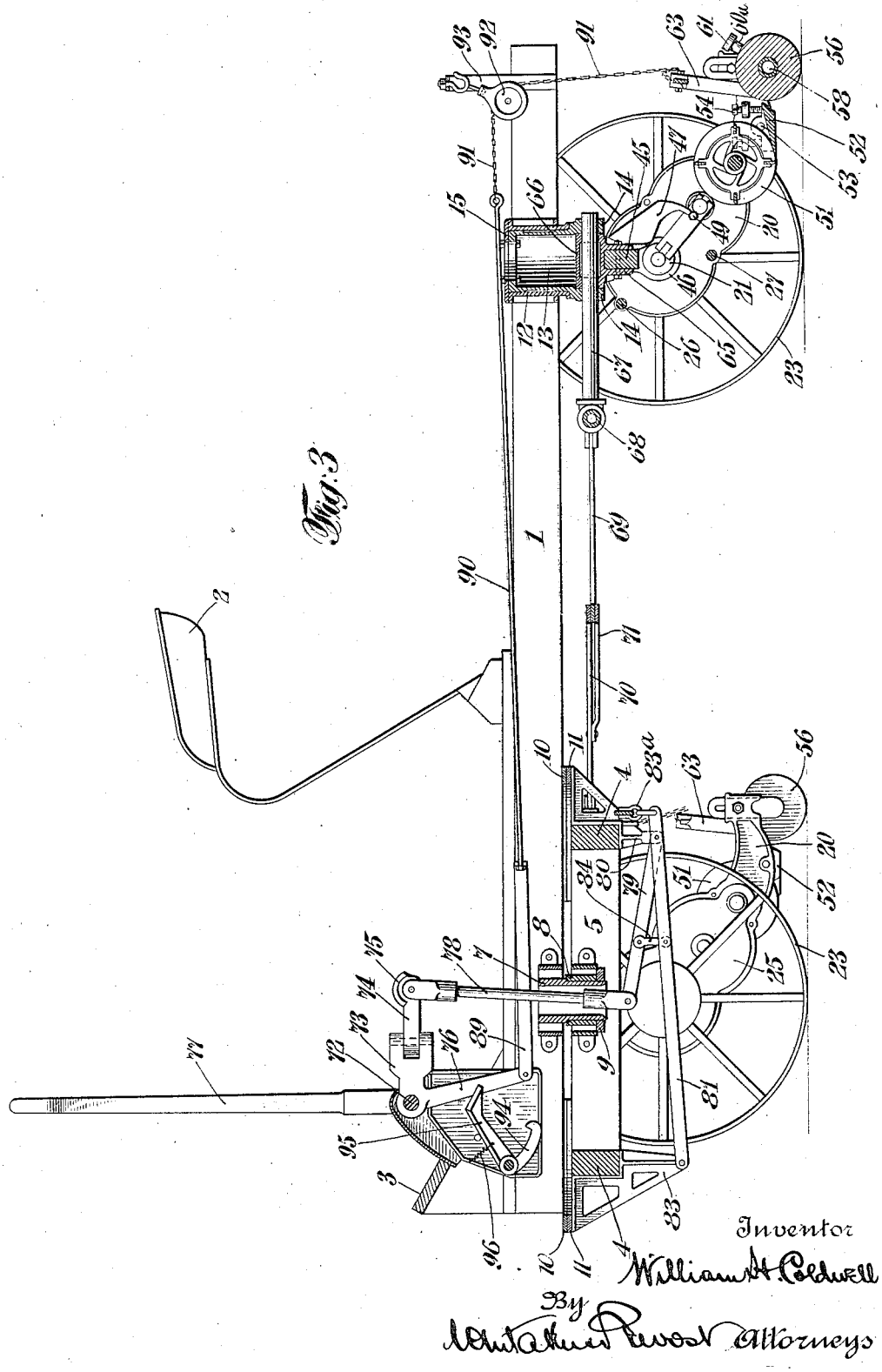

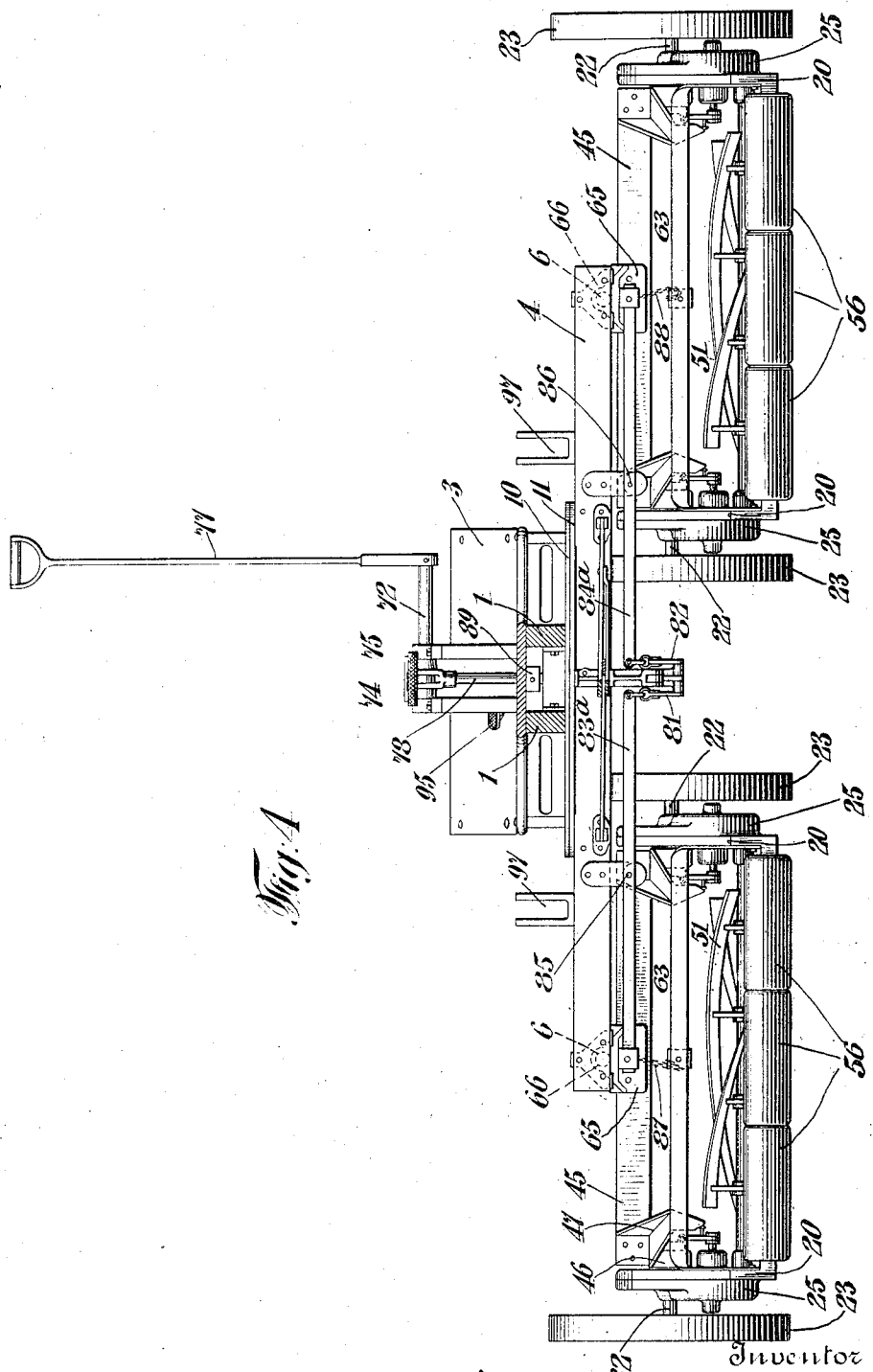

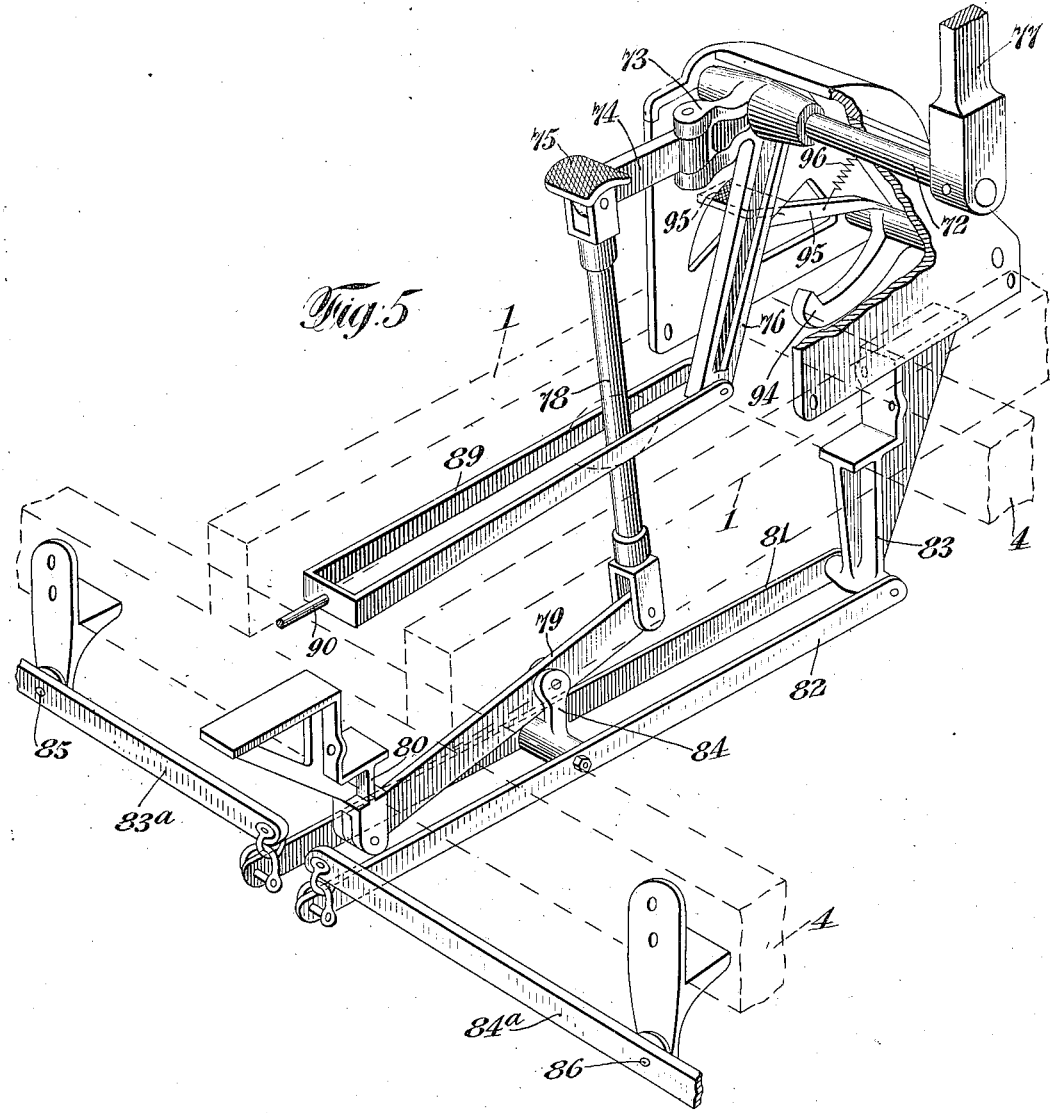
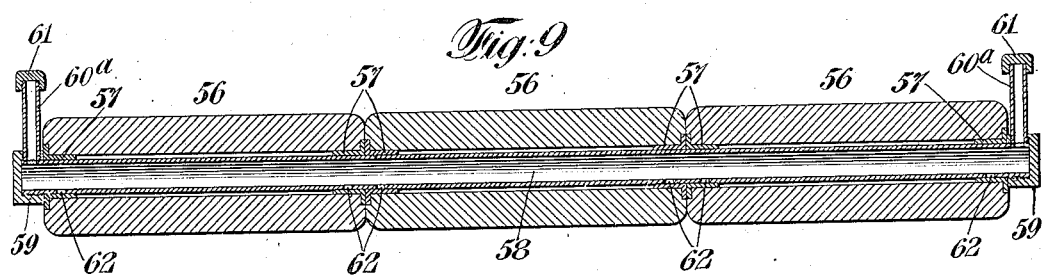

UNITED STATES PATENT OFFICE.

WILLIAM H. COLDWELL, OF NEWBURGH, NEW YORK.

LAWN-MOWER.

1,279,266.

Specification of Letters Patent. Patented Sept. 17, 1918.

Application filed March 29, 1916. Serial No. 87,444.

*To all whom it may concern:*

Be it known that I, WILLIAM H. COLDWELL, a citizen of the United States, residing at Newburgh, in the county of Orange and State of New York, have invented certain new and useful Improvements in Lawn-Mowers; and I do hereby declare the following to be a full, clear, and exact description of the invention, such as will enable others skilled in the art to which it appertains to make and use the same.

My invention consists in the novel features herinafter described, reference being had to the accompanying drawings which illustrate one embodiment of my invention selected by me for purposes of illustration, and the said invention is fully disclosed in the following description and claims.

Referring to the said drawings:

Figure 1 represents a side elevation of a lawn mower embodying my invention and selected by me for the purpose of illustrating the said invention.

Fig. 2 represents a top plan view of the machine with the seat and inclosing portions of the main frame removed for clearness:

Fig. 3 is a longitudinal vertical sectional view of the machine as illustrated in Fig. 2:

Fig. 4 represents a transverse vertical section on the line 4—4 of Fig. 1 looking in the direction of the arrows in that figure:

Fig. 5 is a perspective view of the mechanism for simultaneously lifting the cutting mechanisms of the several lawn mower units out of operative relation with the ground, adjacent portions of the machine being indicated in dotted lines:

Fig. 6 is an enlarged vertical sectional view longitudinally of the machine, of one of the lawn mower units:

Fig. 7 represents a section on line 7—7 of Fig. 6, through the mower side frame and gear casing, illustrating the driving gearing for the rotary cutter, and the means for throwing the same into and out of operation:

Fig. 8 is a detail view of one of the pinions for driving the rotary cutter:

Fig. 9 represents an enlarged sectional view of the rear ground roll for one of the mower units, illustrating the manner of lubricating the same.

One of the objects of my invention is to provide what might be termed a multiple lawn mower, that is to say, a lawn mower comprising a plurality of mower units suitably connected for the purpose of mowing a swath of very considerable width, far beyond that of an ordinary hand, horse or power mower, as at present constructed, wherein a plurality of mower units are arranged side by side in one rank while another mower unit, or other mower units are arranged in another rank in such manner as to cut that portion of the grass which is left between the cutting mechanisms of the mower units of the first mentioned rank, and which may either precede or follow the mower units of the first mentioned rank, the mower units of the two ranks being arranged to oscillate about separate pivotal connections having vertical axes and the unit or units of one rank being connected with the unit or units of the other rank so that the turning of a unit or units of one rank positively turns a unit or units of the other rank. As a result of this construction the lawn mower unit or units of one rank are maintained at all times positively in proper relation to the unit or units of the other rank so that the full width of the swath for which the machine is designed will always be cut whether the machine is moving in a straight direction or in a curve, and whereby the machine can be moved backwardly as well as forwardly while maintaining the units of the several ranks in proper relation to each other, and whereby the turning of the machine either when moving forwardly or rearwardly is facilitated.

My invention also includes mechanism for simultaneously raising the cutting mechanisms of the several mower units out of operative relation with the ground without interfering with or interference from the oscillation of the mower units before referred to, and my invention also includes mechanism for simultaneously disconnecting the driving mechanisms for the rotary cutters of the several mower units.

My invention also includes certain details of construction of the machine itself, and of the individual mower units thereof, all of which are hereinafter fully described and particularly pointed out in the claims.

In the embodiment of my invention selected by me for purposes of illustration and shown in the accompanying drawings, the machine is provided with three separate mower units which are preferably identical in construction and operation and are so combined in the machine that two of said units are arranged side by side in one rank while the third unit is arranged in the other rank in such a position as to cut the grass which would be left between the cutting mechanisms of the two units of the other rank. In this embodiment of my invention, I have shown the machine arranged to be drawn by a horse or horses in such direction that when moving forwardly the two mower units will constitute the front rank, and the single unit the rear rank, but I do not desire to be limited to this method or direction of traction, as the machine may be propelled in the opposite direction by reversing the mower units with respect to the main frame, and I do not limit myself to this particular number of mower units, as I may, for example, in some instances employ three mower units in one rank and two mower units in the other rank, etc.

In the embodiment of my invention herein shown, I provide a longitudinally disposed main frame or reach which comprises, in this instance, a pair of parallel longitudinal frame bars, 1—1, suitably connected together and provided preferably with the driver's seat, 2, and foot rest, 3, the said frame or reach being supported by the rotary ground engaging devices of the several mower units as hereinafter described. Adjacent to one end, I provide a transversely extending frame connected to the main frame by a pivotal connection having a vertical axis, and comprising, in this instance, a pair of transversely disposed parallel bars, 4—4, connected by longitudinally disposed central bars, 5—5, which normally lie beneath the bars, 1—1, the said transverse bars, 4—4, being connected at their outer ends by cross bars, 6—6, extending longitudinally of the machine, to each of which one of the front rank mower units is pivotally connected as hereinafter described, so as to permit each of said units to rock transversely upon a horizontal axis extending longitudinally of the machine.

In this instance, the main frame bars, 1—1, carry a pivot sleeve, 7, see Fig. 3, which extends downwardly through a pivot sleeve, 8, carried by the transverse frame, the two frames being held together by a nut, 9, engaging a threaded portion at the lower end of the sleeve, 7, and in order to sustain the weight of the main frame and the operator, the main frame and also the transverse frame are provided with horizontal bearing segments, 10—10, and 11—11, respectively, which are curved concentrically with the axis of the pivotal connection, 7—8.

I prefer to make the mower units for both ranks identical in all respects as this effects a considerable amount of economy in the manufacture and assembling of the machine, and a description of one of the mower units will, therefore, suffice for all. Each of the mower units comprises a pair of side frames, 20—20, each of which is provided on its inner face with an enlarged friction hub, 21, see Figs. 6 and 7, the hubs of each pair of side frames being in axial alinement, and each of said side frames is provided with a stub axle, 22, secured to one of the ground wheels, 23, of the mower unit. Each of said axles, 22, is provided with a driving gear, 24, for transmitting power to drive the rotary cutter, and the said frames are provided with bearings for the stub axle, the shaft of the rotary cutter and the intermediate gearing, in any suitable manner.

I prefer to provide each of the side frames with an exterior gear casing, 25, forming part thereof, and secured rigidly thereto, but they may be formed in other ways. In the present instance, I have shown the side frames of each unit rigidly connected by transverse tie rods, 26—27, which are preferably shouldered as indicated in Fig. 7, the reduced portion being passed through suitable apertures in the side frame and casing and provided with nuts, 28, which serve to hold the gear casings and side frames together, and also to connect two side frames of the mower unit.

The gear wheel, 24, is preferably splined on the stub axle, 22, and the said axle is provided with bearing cones, 29—29, engaging balls carried in cups, 30, which are supported in recesses in the friction hub, 21, of the side frame, and a corresponding portion of the gear case, and I provide a set screw, 31, which, in this instance, extends through the end of the hub, 21, for adjusting the cups, 30, with respect to the cones, 29. It will be seen that this one set screw will accurately adjust the entire bearing including both cones and both cups, and the set screw is preferably provided with a jam nut for locking it in position. 32 represents the shaft of a rotary cutter the end portions of which are mounted in bearings in the side frames and are provided with a pinion, 33, connected thereto by an over-running clutch construction in a well known way. For example, the interior of the pinion or the hub thereof may be provided with a series of ratchet teeth and the shaft may be provided with a sliding pawl, 34, lying in a transverse recess in the shaft, as shown in Figs. 7 and 8.

Between the stub axle and the cutter shaft, each side frame is provided with a shouldered bearing sleeve, 35, supporting an intermediate pinion, 36, meshing with the driving gear, 24, on the stub axle. A gear shift rod, 37, extends through the bearing sleeve, 35, and is provided with a shifting gear, 38, pinned or otherwise rigidly secured to the shifting rod, 37, and meshing with the pinion, 33, on the cutter shaft, which latter is provided with a wider face than the gear, 38. The pinion, 36, and gear, 38, are thus co-axial and are provided with inter-engaging clutch members comprising, in this instance, studs, 39, on their approximate faces, so that when the gear, 37, is in its innermost position, that is closely adjacent to the pinion, 35, the clutch studs of one will engage the clutch studs of the other, when the rotary cutter will be operated by the forward rotation of the ground wheel 23. It will thus be seen that by pushing the shifting rod, 37, outwardly the gear, 38, will be moved so as to disengage the clutch members of the gear, 38, and pinion, 36, while retaining its engagement with the pinion, 33.

I prefer to provide means for automatically disconnecting the driving mechanism from the rotary cutter, which, in this instance, comprises the following elements: The inner end of the gear shifting rod, 37, is provided with an annular grooved portion which is engaged by a yoke on one end of a gear shifting lever, 40, pivoted, in this instance, to a lug projecting inwardly from the friction hub, 21, or other suitable portion of the side frame. The shifting lever, 40, is provided with an actuating spring, 41, which, in this instance, is coiled around a retaining rod, 42, having one end attached to the adjacent side frame, and the other end extending through an aperture in the shifting lever, and provided with an adjusting nut, 43, so that the tension of the spring, 41, normally holds the shifting rod, 37, and the gear, 38, in their innermost positions, and thus connects the pinion, 33, at each end of the rotary cutter shaft, with the corresponding driving gear, 24.

Each of the mower units is provided with a transverse supporting bar, 45, preferably of wood, provided at each end with a bearing sleeve, 46, engaging the friction hub, 21, of the adjacent side frame, and the transverse bar, 45, is also provided at each end with a rearwardly extending bracket, 47, having a depending cam portion, 48, adapted to be engaged by a part connected with the shifting lever 40, when the rear end of the mower unit is raised out of operative relation with the ground, so as to operate the shifting lever and force the shifting rod, 37, and gear, 38, to their outermost positions. In this instance, the shifting lever, 40, is provided with an adjustable stop or screw, 49, adapted to engage the cam, 48, so that by simply lifting the rear end of the mower unit the shifting lever, 40, at each side of the same will be actuated, and the rotary cutter will be thrown out of gear at each end of the shaft.

I find it convenient to form the sleeve, 46, and bracket, 47, integral with a socket, 50, in which the cross bar, 41, is inserted and bolted, but I do not limit myself to this construction. 51 represents the rotary cutter of usual or any preferred construction carried by the cutter shaft, 32, and 52 represents the stationary knife bar pivotally mounted at 53 at each end in the side frames, and provided with adjusting screws, 54, for rocking it upon its pivots to bring the stationary knife, 52$^a$, into the proper adjusted relation with the knives of the rotary cutter. The rear end of the side frames are supported by the usual ground roller, which is preferably formed, as shown in Fig. 9, in three or any number of parts, 56, each of which is provided with bushings, 57, at each end engaging a hollow shaft, 58, the ends of which are screwed into hangers, 59, which close the ends of the hollow shaft, and are provided with vertically disposed slotted portions, 60, adjustably secured to the side frames.

On one or both ends of the hollow shaft, 58, (both ends as shown in Fig. 9) I drill a hole through the hanger, 59, and the hollow shaft, 58, and insert a vertically disposed pipe, 60$^a$, provided with a removable cap or closure, 61. This pipe, 60$^a$, prevents the rotation of the shaft, 58, in the hangers, and through the said pipe, liquid or semi-liquid lubricant can be introduced so as to fill the pipe, 58, throughout its length and said pipe is provided on its lower side adjacent to each of the bushings, 57, with an aperture, 62, so that the lubricant, which is preferably in semiliquid form is supplied to the bearings of the sectional roller, and, as a matter of fact, by charging the tubular shaft, a sufficient amount of lubricant can be supplied for almost, if not quite, an entire season. I also prefer to provide each of the mower units with a lifting bail, 63, having its depending arms connected to the rear ends of the side frames so that they may be raised by means of the bail, the said side frames pivoting upon the axis of the friction hub, 21. It will be noted that the friction hub is of considerable size, and in practice it fits snugly within the bearing sleeves, 46, and supports a portion of the weight of the superstructure, so that a certain amount of friction must be overcome in raising the rear end of the side frames in addition to lifting the weight of the side frames and connecting parts. I find that this frictional resistance is advantageous in preventing the rear end of the mower units from jumping in passing over uneven ground.

I have stated heretofore that each of the mower units is constructed in exactly the same manner. Each of the transverse supporting bars, 45, is provided with means for pivotally connecting it with that portion of the apparatus which is supported thereby in such a manner that the mower unit may rock transversely upon a horizontal axis. I prefer to provide each of the cross bars, 45, with a saddle, 65, which is provided with flanged portions engaging the cross bar, 45, and with a horizontal sleeve, 66. The two front mower units of the entire machine are connected to the transverse frame, before described, by passing the longitudinally disposed rods, 6, thereof through the sleeves, 66, of the respective units, the sleeves being held in place on said bars by suitable collars, thus supporting the transverse frame, and the front part of the main frame of the machine.

The rear end of the main frame is provided with a vertical pivot construction which, in this intance, consists of an exterior sleeve, 12, secured to the main frame bars, 1, and engaging the inner sleeve or casting, 13, provided at its lower end with perforated ears, 14—14, see Fig. 3, between which is fitted the sleeve, 66, of the rear mower unit, and the longitudinally disposed rod, 67, extends loosely through the ears, 14, and the sleeves, 66, and is secured therein by reason of its connection with the diagonal connecting bars 69—70 hereinafter described, so as to connect the rear mower unit with the main frame, in such a manner that it may be oscillated upon the vertical pivotal connection, and also be free to rock transversely upon the axis of the rod or bar, 67.

The vertically disposed bearing sleeves, 12 and 13, are held in fixed relation in any suitable manner, in this instance, by a retaining ring, 15, which is bolted to an inwardly extending flange at the upper end of the inner sleeve, 13, and engages the outer end of the exterior sleeve, 12. The forward end of the bar, 67, which I may term the steering bar of the rear mower unit, is provided with a cross bar, 68, and I provide diagonal connecting bars, 69 and 70, having their rear ends pivoted to the outer ends of the bar, 68, said connecting bars crossing each other and having their forward ends pivotally connected to brackets secured to the transverse frame carrying the cutter units of the other rank. These cross bars are not connected and are free to move laterally or transversely with respect to each other. The parts are so constructed and arranged that whenever the cutter unit or cutter units of one rank is or are turned upon the pivotal connection with the main frame, the mower unit or units of the other rank will be positively turned in the opposite direction thereby maintaining the cutter units of the separate ranks in proper relation whether the machine is moving in a straight line or in a curve, and whether it is moving forward or rearwardly. During these turning movements the steering bar, 67, may move slightly longitudinally and this movement together with the normal lost motion present in the ordinary pivotal connections at the ends of the cross bars, 69—70, and between the steering bar and the parts which it engages compensates for the slight variations between the centers of the pivotal connections of said cross bars due to their changes of position.

This construction is of additional importance in moving the machine rearwardly as without it the rear mower unit or units would tend to swing to one side and be forced sidewise so as to seriously injure the turf while with my construction the machine may be moved with the greatest ease, either forwardly or rearwardly, and turned with the greatest facility while at all times maintaining the cutting devices of all units of each rank in proper position with respect to each other so that the full width of the swath within the exterior limits of the widest rank will be cut, and no grass will be passed over without being cut when the machine is moving in a forward direction.

It will also be noted that as the rotary cutter of each mower unit is capable of being driven from either end by the adjacent ground wheel of the unit, and is connected therewith by means including an over-running pawl and ratchet construction hereinbefore described, the cutter will always be driven by the ground wheel of the mower unit, which is moving forwardly at the greater speed. This insures a sufficient speed for the rotary cutter in passing around curves. It will also be seen that in swinging the front rank of cutters in one direction or the other the diagonal rods or bars, 69—70, will positively move one end of the rear mower unit forward while the other end will be moved backward or retarded. This, however, does not affect the cutting as the rotary cutter of the rear unit will nevertheless be driven by the ground wheel at the side of the machine which is moved forward and which is, therefore, rotated more rapidly than the other. I prefer to provide one of the diagonal bars, as 70, with a strip, 71, which embraces the other bar to prevent the bars from rattling.

I provide the machine with mechanism for simultaneously lifting the cutting mechanisms of all the mower units simultaneously out of operative relation with the ground without interfering with or being affected by the relative lateral oscillation or turning of the separate mower units. The specific form of mechanism which I have devised for this purpose comprises a lifting lever adjacent to the forward end of the machine within convenient reach of the driver and suitably connected with the mower units of the adjacent rank by means extending substantially axially with respect to the forward pivotal connection between the transversely extending frame and the main frame, and a connection extending longitudinally of the main frame in line with both pivotal axes for raising the cutting mechanism of the mower unit or units of the other rank.

The specific form of this apparatus as embodied in the machine, shown in the accompanying drawings, comprises a horizontal rock shaft, 72, mounted in suitable bearings at the front of the machine and carrying a horizontally disposed arm, and a downwardly extending arm which may be formed conveniently as a bell crank. The horizontal arm may also be formed in two parts, 73—74, connected by a vertical pivot, although this is not absolutely necessary and the rear end of the horizontal arm, (arm 74) is provided preferably with a foot plate, 75, upon which the operator can place his foot to assist in the lifting operation. The downwardly extending arm is indicated at 76 and the rock shaft, 72, is provided at one end with the lifting lever, 77, which preferably stands in a substantially vertical position. A vertically disposed bar, 78, is pivoted at its upper end to the rear end of the horizontal arm (arm 74) and extends downwardly through the sleeve, 7, and substantially axially thereto, its lower end being connected with the forward end of a lever, 79, the rear end of which is pivoted to a bracket, 80, secured to the rear cross bar, 4, of the transverse frame. In order to prevent straining of the parts I prefer that the pivoted portions at the upper and lower ends of the rod, 78, shall be swiveled with respect to each other to accommodate the swinging of the transverse frame with respect to the main frame.

Adjacent to and below the lever, 79, I provide a pair of levers, 81—82, having their forward ends connected to a front bracket, 83, the said levers being connected to the lever, 79, by a link, 84, so that as the forward end of the lever, 79, is depressed the rear ends of the levers, 81—82, will be depressed. The rear ends of the levers, 81—82 are connected to the inner ends of transversely disposed levers, 83ª—84ª, pivoted at 85—86, respectively, to brackets secured to the rear transverse frame bar, 4, of the transverse frame, and having their outer ends connected by chains, 87—88, with the bails, 63, of the respective mower units of the front rank.

The downwardly extending arm, 76, of the lifting mechanism is provided with a connection, which extends rearwardly, longitudinally of the main frame to the rear end of the same where it is connected with a flexible connection passing over a pulley and extending down to the bail, 63, of the rear mower unit. For this purpose, I prefer to employ a yoke, 89, which is secured to the downwardly extending arm, 76, and straddles the vertical rod, 78, a draw rod, 90, secured to said yoke at its front end and at its rear end to a chain, 91, passing over the pulley, 92, which is supported from a yoke or bracket, 93, carried on the rear end of the main frame, the chain, 91, extending around said pulley and to the bail, 63, of the rear mower unit. It will thus be seen that when the lever, 77, is moved rearwardly, the rod, 78, will be depressed, thereby depressing the rear ends of the levers, 81—82, and raising the rear ends of the front rank mower units while simultaneously the arm, 76, will be moved forward so as to elevate the rear end of the rear rank mower unit. It will also be seen that as the rod, 78, passes through the front pivotal connection, and as the draw of the connections to the rear rank mower unit extends over the front and rear pivotal connections of the main frame, the lifting mechanism will operate whether the machine is moving in straight line or curve.

I also provide means for locking the lifting mechanism so as to hold the rear ends of the several mower units in raised position, when desired, as in passing from one field to another or along the road, without cutting, and in this instance, I have shown a spring actuated pawl, 94, pivoted at the front of the machine in such a position as to engage the lower end of the arm, 76, and lock it when it is moved forward, the said pawl being operatively connected with a foot actuated trip lever, 95, and held in operative position by a spring, 96, so that the pawl can be released by the foot when it is desired to lower the cutting mechanisms into operative relation with the ground.

I have heretofore described the mechanism by which the driving gearing of the rotary cutters is thrown out of operation when the rear end of the frame is elevated so as to bring the screws, 49, into engagement with the actuating cams, 48, connected with the cross bars, 45, and it will be seen that by operating the lifting lever, 77, the cutting mechanisms of the several mower units are not only raised out of operative position, but are thrown out of operative connection with the driving mechanism for the rotary cutters so that the rotary cutters will not be driven while in elevated position. It will also be obvious that when it is desired to cut grass it is only necessary to release the lifting mechanism and permit the rear ends of all the mower units to descend until the ground rollers thereof rest on the ground when the rotary cutters will be automatically connected with their driving mechanisms, and will be brought into operation.

In the construction of my improved multiple lawn mower, I prefer to form the main frame, the transverse swiveled frame, and the cross bars, 45, of the several mower units of wood, thus making a very light and strong structure, but I do not limit myself to this structure. I also prefer to inclose the rearwardly extending connections from the arm, 76, to the bail of the rear mower unit by a flooring, 96, forward of the driver's seat and light box or casing, 97, for appearance sake, but these details are not important.

The machine may be drawn by one horse or two horses, as preferred, and I prefer to provide the front cross bar, 4, of the transverse frame with coupling brackets, 97—97, to which a pair of shafts, 98, may be connected, (or a tongue) in any usual manner, so that the machine can be steered by means of the draft mechanism which will turn the front transverse frame to the right or left upon its pivotal connection, 7—8, thereby simultaneously turning the rear rank mower unit in the opposite direction by means of the diagonal connecting bars, 69—70, as before described.

It will be noted that the cutting mechanism of each mower unit can rise and fall independently the lifting chains or connections being provided with a certain amount of slack, as shown in the drawings, and also rock transversely upon the horizontal axis of its pivotal connection with one of the bars, 6—6, or steering bar, 67, so that they can independently adapt themselves to the irregularities of the surface traversed.

The specific mechanism of the clutch, and shifting mechanism therefore herein shown and described for the purpose of disconnecting the rotary cutters of the several mower units is not specifically claimed herein, but is claimed in the applicant's copending application, Serial No. 103,754, filed June 15, 1916. The specific form of wheel mounting herein shown and described is also not claimed as it forms the subject matter of a separate and copending application filed by the applicant Sept. 21, 1916, Serial No. 121,367, and being a division of this application and of applicant's above mentioned application, Serial No. 103,754. The specific form of roller mounting for the rear roller of the mower units herein shown and described is also not claimed herein as it forms the subject matter of another copending application filed by the applicant Sept. 21, 1916, Serial No. 121,368 and being a division of this application and of the applicant's above mentioned application, Ser. No. 103,754.

What I claim and desire to secure by Letters Patent is:

1. In a multiple lawn mower, the combination of independent mower units arranged in two ranks, one in advance of the other, the mower units of one rank being arranged in line longitudinally with spaces between the mower units of the other rank, means for turning one rank to the right or left to steer the machine, and operative connections between said ranks constructed to cause their simultaneous turning in opposite directions, said connections maintaining the relative positions of the mower units of the several ranks with respect to the path of the machine at all times.

2. In a multiple lawn mower, the combination with independent mower units arranged in two ranks, one in advance of the other, a main frame extending from one rank to the other and connected with each rank by a pivotal connection having a vertical axis, whereby each of said ranks can be turned to the right or left in steering the machine, each of said mower units being provided with rotary ground engaging devices and cutting mechanism movable vertically with respect thereto, and means for simultaneously raising and lowering the cutting mechanisms of the mower units of both ranks without interfering with the turning movements of either.

3. In a multiple lawn mower, the combination with independent mower units arranged in two ranks, one in advance of the other, a main frame extending from one rank to the other and connected with each rank by a pivotal connection having a vertical axis, connections from one rank to the other constructed to effect the simultaneous turning of said ranks upon their respective pivotal connections in opposite directions, each of said mower units being provided with independent ground engaging devices, and cutting mechanism movable vertically with respect thereto, and means for simultaneously raising and lowering the cutting mechanism of the mower units of both ranks without interfering with the turning movements of either.

4. In a multiple lawn mower, the combination with a longitudinally disposed main frame, of a transverse frame connected therewith adjacent to one end of the main frame by a pivotal connection having a vertical axis, a plurality of mower units connected to said transverse frame by means permitting them to rock transversely independently of each other with respect to said frame, a mower unit connected with the main frame adjacent to its other end, each of said mower units being provided with rotary ground engaging devices, and cutting mechanism movable vertically with respect thereto, lifting mechanism carried by the main frame, connections from said lifting mechanism to each of the mower units connected with said transverse frame for lifting the cutting mechanism thereof, and having a portion extending through the pivotal connection between the main frame and said transverse frame substantially axially thereof, and a connection from said lifting mechanism to the mower unit adjacent to the other end of the main frame for lifting the cutting mechanism thereof.

5. In a multiple lawn mower, the combination with a longitudinally disposed main frame, of a transverse frame connected therewith adjacent to one end of the main frame by a pivotal connection having a vertical axis, a plurality of mower units connected to said transverse frame by means permitting them to rock transversely independently of each other with respect to said frame, a mower unit connected with the main frame adjacent to its other end by pivotal connections having vertical and horizontal axes, connections between said last mentioned unit and said transverse frame for effecting the simultaneous turning thereof upon their respective vertical pivotal connections in opposite directions, a lifting mechanism carried by the main frame, connections from said lifting mechanism to the mower units connected with said transverse frame for lifting the cutting mechanisms thereof, having a portion extending through the pivotal connection between the main frame and said transverse frame substantially axially thereof, and a connection extending longitudinally of the main frame to the mower unit connected with the other end thereof, and substantially in line with the vertical pivotal connection between said mower unit and main frame, for lifting the cutting mechanism of said mower unit.

6. In a multiple lawn mower, the combination with a longitudinally disposed main frame, of a transverse frame connected to the main frame adjacent to its forward end, a plurality of front mower units connected to said transverse frame by means permitting said mower units to rock transversely independently, a rear mower unit, pivotal connections between said mower unit and the rear end of the main frame having vertical and horizontal axes, a lifting mechanism carried by the main frame adjacent to its forward end, and provided with a horizontally disposed lifting arm, a vertically disposed lifting arm, and actuating means for said arms, each of said mower units being provided with ground wheels, and cutting mechanism movable vertically with respect thereto, connections from said horizontal lifting arm to each of the mower units connected with the transverse frame from raising and lowering the cutting mechanism thereof, said connections having a part extending through the pivotal connection between the main frame and transverse frame, substantially axially thereof, and a connection from the vertically disposed lifting arm extending longitudinally of the main frame to the rear mower unit for raising and lowering the cutting mechanism thereof.

7. In a multiple lawn mower, the combination with a longitudinally disposed main frame, of a transverse frame connected to the main frame adjacent to its forward end, a plurality of front mower units connected to said transverse frame by means permitting said mower units to rock transversely independently, a rear mower unit, pivotal connections between said mower unit and the rear end of the main frame having vertical and horizontal axes, a lifting mechanism carried by the main frame adjacent to its forward end, and provided with a horizontally disposed lifting arm, a vertically disposed lifting arm, and actuating means for said arms, each of said mower units being provided with ground wheels, and cutting mechanism movable vertically with respect thereto, connections from said horizontal lifting arm to each of the mower units connected with the transverse frame for raising and lowering the cutting mechanism thereof, said connections having a part extending through the pivotal connection between the main frame and transverse frame, substantially axially thereof, and a connection from the vertically disposed lifting arm extending longitudinally of the main frame to the rear mower unit for raising and lowering the cutting mechanism thereof, and means for locking said lifting arms when the cutting mechanisms of the mower units are in raised position.

8. In a multiple lawn mower, the combination of a plurality of independent mower units each provided with ground wheels, and cutting mechanism movable vertically with respect to the ground wheels, and including a rotary cutter adapted to be driven by said ground wheels, said mower units being arranged in two ranks, one rank in advance of the other, and means for simultaneously disconnecting the rotary cutters of all of said mower units from their respective actuating means.

9. In a multiple lawn mower, the combination of a plurality of independent mower units each provided with ground wheels, and cutting mechanism movable vertically with respect to the ground wheels, and including a rotary cutter adapted to be driven by said ground wheels, said mower units being arranged in two ranks, one rank in advance of the other, and means for simultaneously elevating the cutting mechanisms of all of said mower units out of operative relation with the ground and disconnecting them from their actuating devices.

10. In a multiple lawn mower, the combination with a plurality of separate mower units arranged in two ranks, one in advance of the other, each of said mower units being provided with ground wheels, cutting mechanism including a rotary cutter, driving connections from the ground wheels to the rotary cutter, clutch mechanism interposed in said connections, a shifting mechanism for said clutch mechanism, and a cam adapted to engage said shifting mechanism to throw out the clutch mechanism, and means for simultaneously effecting the engagement of said shifting mechanisms and cams of all of said mower units to throw the rotary cutters out of operation.

11. In a multiple lawn mower, the combination with a plurality of separate mower units arranged in two ranks, one in advance of the other, each of said mower units being provided with ground wheels, cutting mechanism movable vertically with respect thereto and including a rotary cutter, driving connections from the ground wheels to the rotary cutter, clutch mechanism interposed in said connections, a shifting mechanism for said clutch mechanism, and a cam adapted to engage said shifting mechanism to throw out the clutch mechanism, and means for simultaneously raising the cutting mechanism of each of said mower units out of operative relation and effecting the engagement of the cams and shifting mechanism thereof to throw the rotary cutters out of operation.

12. In a multiple lawn mower, the combination with a plurality of separate mower units arranged in two ranks, one in advance of the other, each of said mower units being provided with ground wheels, cutting mechanism movable vertically with respect thereto and including a rotary cutter, driving connections from the ground wheels to the rotary cutter, clutch mechanism interposed in said connections, a shifting mechanism for said clutch mechanism, and a stationary actuating device adapted to engage the shifting mechanism when the cutting mechanism is elevated, to throw the rotary cutter out of operation, and means for simultaneously lifting the cutting mechanisms of all of said mower units.

13. In a multiple lawn mower, the combination with independent mower units arranged in two ranks, one in advance of the other, a main frame connecting said ranks and having a pivotal connection therewith whereby each of said ranks may be turned with respect to the main frame, each of said mower units being provided with ground wheels, cutting mechanism movable vertically with respect thereto, and including a rotary cutter, driving connections from a ground wheel to the rotary cutter, clutch mechanism in said connections, shifting mechanism for said clutch mechanism, and a fixed actuating device adapted to engage and operate the shifting mechanism when the cutting mechanism is elevated, lifting mechanism carried by the main frame, and connections between said lifting mechanism and each of said mower units for elevating the cutting mechanism thereof, and simultaneously throwing the rotary cutters out of operation without interfering with the pivotal connections, and connecting devices from one rank to the other for effecting the simultaneous turning of the two ranks upon their pivotal connections with the main frame in opposite directions.

14. In a lawn mower, the combination with a frame of a mower unit connected therewith, and comprising a horizontal support, a mower frame, said support and mower frame being connected by a pivotal connection, the members of said pivotal connection having opposed surfaces in tight frictional engagement so as to offer resistance to pivotal movement, having a horizontal axis extending transversely of the mower unit, ground wheels for supporting the mower frame and said support, independent rotary ground engaging devices for supporting other portions of the mower frame, cutting mechanism carried by the mower frame adjacent to said independent rotary ground engaging devices and including a rotary cutter, and driving connections from a ground wheel to said rotary cutter, whereby said friction pivotal connections will assist in preventing the accidental elevation of the cutting mechanism with respect to the ground.

15. In a lawn mower, the combination with a frame, of a mower unit connected therewith by a pivotal connection having a horizontal longitudinally disposed axis and comprising a cross bar secured to a part of said pivotal connection, and provided with bearing apertures, a mower frame having friction hubs tightly fitting said bearing apertures, so as to offer resistance to pivotal movement, ground wheels connected with said mower frame and having their axes substantially co-incident with the axes of said hubs and bearings, rotary ground engaging devices for supporting other portions of the mower frame, cutting mechanism carried by the mower frame and including a rotary cutter, and connections from a ground wheel to the rotary cutter for driving the same.

16. In a lawn mower, the combination with a mower frame, ground wheels connected therewith, and supporting a portion of said frame, independent rotary ground engaging devices supporting other portions of said frame, cutting mechanism adjacent to said independent rotary devices, including a rotary cutter, connections between a ground wheel and said rotary cutter for driving the same clutch mechanism in said connections, and shifting mechanism for said clutch mechanism, a supporting frame member pivotally connected with the mower frame and supported thereby, actuating means for said shifting mechanism carried by said supporting frame member, and means for effecting the relative movement of said shifting mechanism and actuating mechanism to operate said shifting mechanism and throw the rotary cutter into and out of operation.

17. In a lawn mower, the combination with a mower frame, ground wheels connected therewith and supporting a portion of said frame, independent rotary ground engaging devices supporting other portions of said frame, cutting mechanism adjacent to said independent rotary devices, including a rotary cutter, connections between a ground wheel and said rotary cutter for driving the same, clutch mechanism in said connections, and shifting mechanism for said clutch mechanism, a supporting frame member pivotally connected with the mower frame and supported thereby, actuating means for said shifting mechanism carried by said support, and means for elevating the portion of the mower frame carrying the cutting mechanism to bring the shifting mechanism and actuating means therefor into operative relation to throw the rotary cutter out of operation.

18. In a gang lawn mower having mower units provided with rotary cutter mechanism and a main frame uniting and spacing said units, the combination of a driving element for each said mechanism, and means for simultaneously shifting the driving elements of two or more of said units to non-driving relation.

19. In a gang lawn mower, a main frame to carry the operator and provided with a fifth-wheel joint, a series of mower units carrying said frame and each comprising ground wheels and cutter mechanism driven thereby, in combination with a control device having operating connections running to each of the said units and adapted to disconnect the said cutter mechanism from their respective ground wheels.

20. In a gang lawn mower, a main frame adapted to carry the operator and provided with a fifth-wheel joint, a gang of mower units supporting the frame and each comprising ground wheels and cutter mechanism driven thereby and adapted to be lifted from the ground, in combination with a control device on the frame and connecting means operated thereby to lift and disconnect the said cutter mechanism from their respective ground wheels.

In testimony whereof I affix my signature.

WILLIAM H. COLDWELL.